United States Patent
Noh et al.

(10) Patent No.: US 9,161,251 B2
(45) Date of Patent: Oct. 13, 2015

(54) DATA TRANSMISSION SYSTEM FOR DETERMINING DATA TRANSMISSION POWER USING A VIRTUAL CELL

(75) Inventors: Won Jong Noh, Yongin-si (KR); Yung Yi, Daejeon (KR); Tae Soo Kwon, Seoul (KR); Soo Hwan Lee, Gyeongsan-si (KR); Chang Yong Shin, Seoul (KR)

(73) Assignees: Samsung Electronics Co., Ltd., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 1035 days.

(21) Appl. No.: 13/009,013

(22) Filed: Jan. 19, 2011

(65) Prior Publication Data

US 2011/0244900 A1    Oct. 6, 2011

(30) Foreign Application Priority Data

Apr. 6, 2010    (KR) .................. 10-2010-0031325

(51) Int. Cl.
*H04B 15/00*    (2006.01)
*H04W 24/10*    (2009.01)
*H04W 84/04*    (2009.01)

(52) U.S. Cl.
CPC ............ *H04W 24/10* (2013.01); *H04W 84/045* (2013.01)

(58) Field of Classification Search
CPC .... H04B 7/024; H04B 7/0626; H04B 7/0632; H04B 7/155; H04B 7/022; H04B 7/026; H04B 7/0491; H04B 7/0619; H04B 7/066; H04B 7/26

USPC ................ 455/501, 502, 500; 370/328, 310.2
See application file for complete search history.

(56) References Cited

U.S. PATENT DOCUMENTS

| | | | |
|---|---|---|---|
| 2004/0127223 A1* | 7/2004 | Li et al. .......................... | 455/446 |
| 2008/0188231 A1* | 8/2008 | Zhu et al. ....................... | 455/450 |
| 2010/0029319 A1* | 2/2010 | Higuchi et al. ............... | 455/522 |
| 2010/0039951 A1* | 2/2010 | She et al. ....................... | 370/252 |
| 2010/0197311 A1* | 8/2010 | Walldeen et al. ............. | 455/444 |

FOREIGN PATENT DOCUMENTS

| | | |
|---|---|---|
| JP | 07-336752 | 12/1995 |
| JP | 2003-283506 | 10/2003 |
| KR | 10-2004-0039520 | 5/2004 |
| KR | 10-2006-0016284 | 2/2006 |
| KR | 10-2006-0049401 | 5/2006 |
| KR | 10-2009-0026185 | 3/2009 |
| KR | 10-2009-0039573 | 4/2009 |

* cited by examiner

*Primary Examiner* — Nay A Maung
*Assistant Examiner* — Angelica M Perez
(74) *Attorney, Agent, or Firm* — NSIP Law (57) ABSTRACT

A data transmission system that determines data transmission power using a virtual cell is provided. A base station may receive transmission data from a plurality of cooperative base stations positioned around the base station, and model terminals receiving an interference signal from the base station and the plurality of cooperative base stations into a virtual cell. The base station may calculate the influence of the interference signal transmitted to the terminal, using the virtual cell, and determine a transmission power for a plurality of frequency bands based on the interference signal.

19 Claims, 6 Drawing Sheets

FIG. 3

| COOPERATIVE BASE STATION | FIRST COOPERATIVE BASE STATION | SECOND COOPERATIVE BASE STATION | THIRD COOPERATIVE BASE STATION | |
|---|---|---|---|---|
| FIRST TERMINAL | TERMINAL IDENTIFIER DATA TRANSMISSION PRIORITY<br><br>TYPE OF SERVICE, AMOUNT OF TRANSMISSION DATA, A POINT IN TIME RECEIVING DATA<br><br>CHANNEL GAIN OF INTERFERENCE CHANNEL TOTAL INTERFERENCE AMOUNT ALLOCATED POWER | TERMINAL IDENTIFIER DATA TRANSMISSION PRIORITY<br><br>TYPE OF SERVICE, AMOUNT OF TRANSMISSION DATA, A POINT IN TIME RECEIVING DATA<br><br>CHANNEL GAIN OF INTERFERENCE CHANNEL TOTAL INTERFERENCE AMOUNT ALLOCATED POWER | TERMINAL IDENTIFIER DATA TRANSMISSION PRIORITY<br><br>TYPE OF SERVICE, AMOUNT OF TRANSMISSION DATA, A POINT IN TIME RECEIVING DATA<br><br>CHANNEL GAIN OF INTERFERENCE CHANNEL TOTAL INTERFERENCE AMOUNT ALLOCATED POWER | ⋮ |
| SECOND TERMINAL | | TERMINAL IDENTIFIER DATA TRANSMISSION PRIORITY<br><br>TYPE OF SERVICE, AMOUNT OF TRANSMISSION DATA, A POINT IN TIME RECEIVING DATA<br><br>CHANNEL GAIN OF INTERFERENCE CHANNEL TOTAL INTERFERENCE AMOUNT ALLOCATED POWER | | ⋮ |

DATA TRANSMISSION SYSTEM FOR DETERMINING DATA TRANSMISSION POWER USING A VIRTUAL CELL

CROSS-REFERENCE TO RELATED APPLICATION(S)

This application claims the benefit under 35 U.S.C. §119(a) of Korean Patent Application No. 10-2010-0031325, filed on Apr. 6, 2010, in the Korean Intellectual Property Office, the entire disclosure of which is incorporated herein by reference for all purposes.

BACKGROUND

1. Field

The following description relates to a technique that may determine a transmission power at which to transmit data.

2. Description of Related Art

A radio communication network may include a plurality of base stations and a plurality of terminals. Because respective coverages of the plurality of base stations often overlap, a terminal may receive signals from the plurality of base stations. The additional signals may act as interference.

For example, when a first base station transmits data to a first terminal, and a second base station transmits data to a second terminal, the data transmitted by the first base station may be received by the second terminal. When the second terminal receives signals transmitted by the first base station, the received signals may act as interference signals that reduce the data reception performance of the second terminal. To maintain the data reception performance of the second terminal, a data transmission power of the first base station may be reduced, however, doing so may reduce the data reception performance of the first terminal.

Accordingly, there is a demand for a method of determining a data transmission power that may minimize influence of interference on the first and second terminals while maintaining the data reception performance of the first and second terminals.

SUMMARY

In one general aspect, there is provided a base station, including: a reception unit configured to receive interference channel information between the base station and a plurality of first terminals from the plurality of first terminals receiving interference signals from another base station, a virtual cell modeling unit configured to model the plurality of first terminals and a plurality of cooperative base stations transmitting data to each of the plurality of first terminals into a virtual cell, based on the received interference channel information, and a transmission power determination unit configured to determine the transmission power for each of a plurality of frequency bands with respect to a second terminal receiving a second data signal from the base station, based on the virtual cell.

The base station may further include that the reception unit is further configured to receive the interference channel information via at least one cooperative base station.

The base station may further include that the interference channel information includes at least one of: an identifier of each of the plurality of first terminals, a channel gain of the interference channel, a transmission power of the first data signal, and data transmission priority of the plurality of first terminals.

The base station may further include that the data transmission priority includes at least one of: a type of a service used by each first terminal, an amount of transmission data to be transmitted to the cooperative base station by each first terminal, and a time elapsed after receiving the most recently received data by each first terminal.

The base station may further include that: the reception unit is further configured to periodically receive at least one of: the identifier of each of the plurality of first terminals, the channel gain of the interference channel, the transmission power of the first data signal, and the data transmission priority of the plurality of first terminals, and a reception cycle for the identifier of each of the plurality of first terminals is shorter than a reception cycle for each of: the channel gain of the interference channel, the transmission power of the first data signal, and the data transmission priority of the plurality of first terminals.

The base station may further include that the reception unit is further configured to additionally receive, from the plurality of first terminals, information about a transmission channel between the cooperative base station and the plurality of first terminals.

The base station may further include that the virtual cell modeling unit is further configured to model the virtual cell based on an average of the interference signals received from the base station by the plurality of first terminals.

The base station may further include that the virtual cell modeling unit is further configured to model the virtual cell based on an interference signal including a greatest intensity from among the interference signals received from the base station by the plurality of first terminals.

The base station may further include that the cooperative base station includes a femto base station configured to transmit data using a radio resource unused by the base station.

The base station may further include that: the interference channel information is transmitted to the cooperative base station from the plurality of first terminals, and the reception unit is further configured to: receive the interference channel information using a backbone link between the cooperative base station and the base station, or directly receive the interference channel information from the plurality of first terminals.

The base station may further include that the transmission power determination unit is further configured to determine the transmission power by one calculation.

In another general aspect, there is provided a terminal, including: a reception unit configured to receive interference signals from a base station using a plurality of frequency bands, a channel estimation unit configured to generate, for each of the plurality of frequency bands, interference channel information about a channel between the base station and the terminal based on the interference signals, and a transmission unit configured to transmit the interference channel information to the base station, wherein an intensity of each of the interference signals is controlled for each of the plurality of frequency bands based on the interference channel information.

The terminal may further include that the interference channel information includes at least one of: an identifier of the terminal, a channel gain of the interference channel, and a data transmission priority of the terminal.

The terminal may further include that the data transmission priority includes at least one of: a service type used by the terminal, an amount of transmission data to be transmitted to a cooperative base station neighboring the base station by the terminal, and a time elapsed after receiving the most recently received data by the terminal.

The terminal may further include that the transmission unit is further configured to: transmit the identifier of the terminal in a first transmission cycle, and transmit the channel gain of the interference channel and the data transmission priority of the terminal in a second transmission cycle that is greater than the first transmission cycle.

The terminal may further include that the transmission unit is further configured to transmit the information about the interference channel to the base station via a cooperative neighboring base station.

The terminal may further include that: the interference channel information is used for modeling a virtual cell for the terminal, and the interference signals are controlled based on the virtual cell.

In another general aspect, there is provided a cooperative base station, including: a reception unit configured to receive, from a terminal receiving interference signals from a base station, interference channel information between the base station and the terminal, and a transmission unit configured to transmit the information about the interference channel to the base station, wherein the reception unit is further configured to receive the interference channel information using a plurality of frequency bands, and wherein an intensity of each of the interference signals is controlled for each of the plurality of frequency bands, based on the interference channel information.

The cooperative base station may further include that the interference channel information includes at least one of an identifier of the terminal, a channel gain of the interference channel, and a data transmission priority of the terminal.

The cooperative base station may further include that the data transmission priority includes at least one of: a service type used by the terminal, an amount of transmission data to be transmitted to the cooperative base station by the terminal, and a time elapsed after receiving the most recently received data by the terminal.

The cooperative base station may further include that: the interference channel information is used for modeling a virtual cell for the terminal, and the interference signals are controlled based on the virtual cell.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
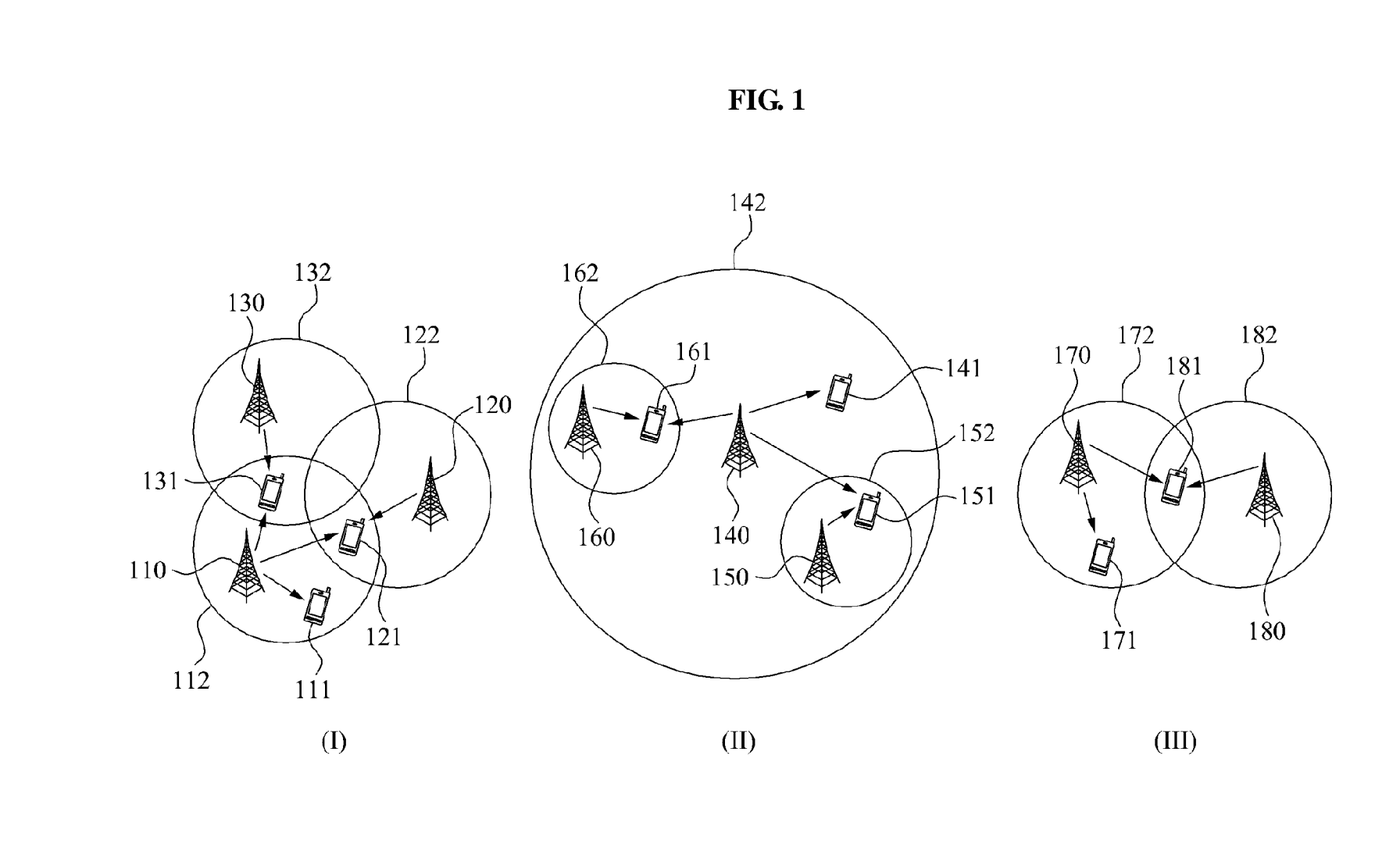
FIG. 1 is a diagram illustrating an example of a virtual cell.

FIG. 1 illustrates an example of a virtual cell. Referring to FIG. 1, image (I) on the left-hand side of FIG. 1 illustrates an example of a data transmission system including a plurality of macro base stations 110, 120, and 130.

A first base station 110 may transmit first data to a first terminal 111 positioned within a coverage 112. A second base station 120 may transmit second data to a second terminal 121 positioned within coverage 122. A third base station 130 may transmit third data to a third terminal 131 positioned within coverage 132. The respective coverages 112, 122, and 132 of the base stations 110, 120, and 130 may overlap. Accordingly, the second and third terminals 121 and 131 may receive the first data from the base station 110. The first data may cause interference with the second and third terminals 121 and 131.

When the second and third terminals 121 and 131 receive the interference signals, the data reception performance of the respective terminals 121 and 131 may be reduced. The first base station 110 may reduce the data transmission power when transmitting the first data, or reduce influence of the interference signals on the first and second terminals by transmitting the first data using another frequency band.

When the data transmission system illustrated in the image (I) of FIG. 1 uses a plurality of frequency bands, each of the base stations 110, 120, and 130 may determine which data is transmitted with respect to each of the plurality of frequency bands, and determine a transmission power at which to transmit each data. For example, the transmission power of each of the plurality of frequency bands may be determined such that the influence of the interference signals each of the plurality of frequency bands may be minimized, and the data reception performance of each terminal may be maximized.

Referring to the image (I) of FIG. 1, when a transmission power of the first base station is reduced while transmitting the first data transmitted to the first terminal 111, data reception performances of the second and third terminals 121 and 131 may be improved. However, when the transmission power of the first base station is reduced the data reception performance of the first terminal 111 may be reduced. Accordingly, an increase or decrease in the data transmission power of a specific base station 110 may lead to an increase or a reduction in the performance of an overall system.

For example, each of base stations 110, 120, and 130 may determine a data transmission power for a specific terminal. In this example, a data transmission for the specific terminal may stop, and data reception performances of other terminals may be significantly increased.

When the data transmission power of the specific terminal is reduced, a data transmission performance of the data transmission system illustrated in the image (I) of FIG. 1 may be reduced. Accordingly, to maximize a data transmission performance of a communication system, the respective base stations 110, 120, and 130 may determine the data transmission power based on the influence of interference on each of the terminals 111, 121, and 131.

In the image (I) of FIG. 1, only three base stations 110, 120, and 130 are illustrated, however, this is merely for purposes of example. That is, a greater or lesser number of base stations may actually exist. If more base stations exist, the number of variables to be considered may increase, and a computation process of each of the variables may become more complex.

Image (II) in the middle of FIG. 1 illustrates an example of a data transmission system including femto base stations 150 and 160 and a master base station 140. A femto base station is a small cellular base station, typically designed for use in a home or small business.

The femto base stations 150 and 160 may transmit data to terminals 151 and 161, respectively, using a radio resource which is temporarily unused by the master base station 140 from among radio resources allocated to the master base station 140. Because the respective coverages 152 and 162 of the femto base stations 150 and 160 are included in a coverage 142 of the master base station 140, interference between the femto base stations 150 and 160 and the master base station 140 may occur. In this example, the respective base stations 140, 150, and 160 may reduce the influence of interference on other base stations by controlling the data transmission power of the base stations.

For example, when transmitting data using a plurality of frequency bands, each of the base stations 140, 150, and 160 may determine a data transmission power for each of the plurality of frequency bands.

In image (II) of FIG. 1, determining of the data transmission power of each of the base stations 140, 150, and 160 may be a significantly complex task, thus causing a significant amount of computation and time.

Image (III) on the right-hand side of FIG. 1 illustrates an example of a virtual cell.

Referring to image (III), a base station 170 may model a plurality of cooperative base stations and a plurality of terminals which are positioned adjacent to the base station 170, into a virtual cell 182. The virtual cell 182 may include a virtual base station 180 and a virtual terminal 181. In this example, influence of interference signals on each of the plurality of cooperative base stations may not be calculated, and only the influence of interference signals on the single virtual cell 182 may be calculated. For example, only the influence of the interference signal on the terminal 181 receiving the interference signal from the base station 170, may be calculated. Accordingly, the influence of interference signal may be calculated, and the data transmission power of the base station 170 may be determined.

In some embodiments, the base station 170 may model the virtual cell based on information about a terminal that receives the strongest interference signal from the base station 170. The terminal may be from among a plurality of terminals connected to a plurality of cooperative base stations.

In some embodiments, the base station 170 may model the virtual cell based on an average interference signal intensity of a plurality of terminals receiving interference signals from the base station 170.

A method for modeling the plurality of cooperative base stations and the plurality of terminals into a single virtual cell is described with reference to FIG. 2.

Figure 2:
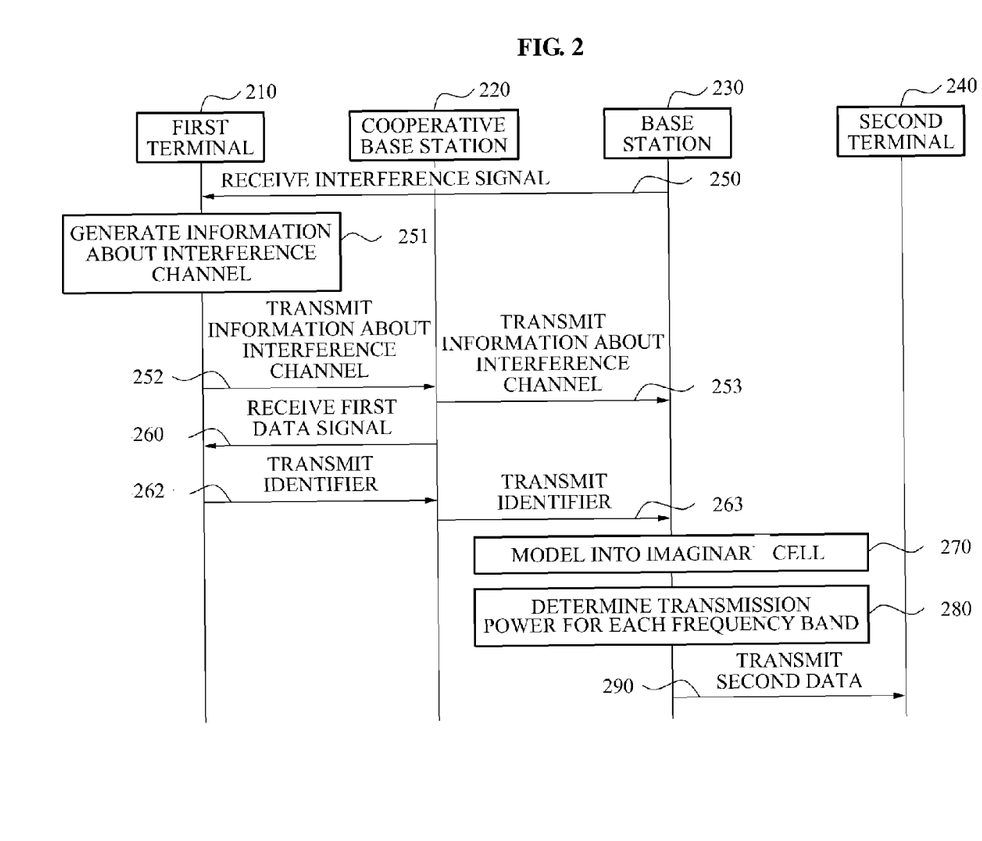
FIG. 2 is a diagram illustrating an example of a process for determining transmission power.

FIG. 2 illustrates an example of a process for determining transmission power.

In FIG. 2, a first terminal 210 is a terminal receiving data from a cooperative base station 220, however, the first terminal 210 may also receive an interference signal from a base station 230. The cooperative base station 220 and the base station 230 may be positioned adjacent to each other, and a second terminal 240 may receive data from the base station 230.

In operation 250, the first terminal 210 may receive the interference signal from the base station 230.

In operation 251, the first terminal 210 may generate information about an interference channel. The interference channel may signify a channel from the base station 230 to the first terminal 210. The interference channel information may be used to determine the data transmission power of the base station 230.

The interference channel information may include at least one of an identifier of the first terminal 210, a transmission power of the interference signal transmitted to the first terminal 210 by the base station 230, a channel gain of the interference channel, and a data transmission priority of the first terminal 210.

The data transmission priority of the first terminal 210 may include information about a point in time when the first terminal 210 receives data, information about a time elapsed after receiving data by the first terminal 210, information about a service used by the first terminal 210, and information about an amount of transmission data to be transmitted to the cooperative base station 220 by the first terminal 210.

In operation 252, the first terminal 210 may transmit the interference channel information to the cooperative base station 220. In operation 253, the cooperative base station 220 may transmit the information about the interference channel to the base station 230. The base station 230 may receive the information about the interference channel, and store the received information in a reference table. The reference table is described with reference to FIG. 3.

In some embodiments, the first terminal 210 may periodically generate the interference channel information, and average the periodically generated information over a predetermined period of time. In operations 252 and 253, the interference channel information transmitted to the base station 230 may be the information about the interference channel averaged over a predetermined period of time.

In some embodiments, the first terminal 210 may periodically transmit, to the base station, the identifier of the first terminal, the channel gain of the interference channel, a transmission power of a first data signal, and a data transmission priority of the first terminal. The transmission cycle of the parameters transmitted by the first terminal 210 may be different from each other.

For example, a transmission cycle for the identifier of each of the first terminals may be shorter than transmission cycles of other parameters. In this example, the identifier of each of the first terminals may be more frequently transmitted in comparison with other parameters.

In operation 260, the first terminal 210 may receive a first data signal from the cooperative base station 220. The cooperative base station 220 may select the first terminal as a terminal to receive data, from among a plurality of terminals, and transmit data to the selected first terminal 210. The base station 230 may not control influence of interference with respect to a terminal that does not receive data from the cooperative base station 220. Accordingly, the base station 230 may determine which terminal receives data from the cooperative base station 220.

As illustrated in the image (I) of FIG. 1, the data transmission system includes the plurality of macro base stations 110, 120, and 130. Because terminals positioned outside each cell may receive interference, an accurate control of the interference may be performed with respect to terminals positioned outside other cells.

In operation 262, the first terminal 210 may transmit its own identifier to the cooperative base station 220. In operation 263, the cooperative base station 220 may transmit the identifier of the first terminal 210 to the base station 230.

In some embodiments, the cooperative base station 220 does not receive the identifier of the first terminal 210.

The cooperative base station 220 may transmit, to the base station 230, only the identifiers of terminals positioned outside each cell, from among terminals receiving data from the cooperative base station 220.

In some embodiments, the terminal receiving data from the cooperative base station 220 may be changed based on a channel state. Because the decision to receive data from the cooperative base station 220 may be performed rather quickly, the identifier of the first terminal 210 receiving the data from the cooperative base station 220 may be transmitted to the base station 230 in a significantly short transmission cycle.

In some embodiments, the first terminal 210 may periodically transmit, to the base station, the channel gain of the interference channel, the transmission power of the first data signal, the data transmission priority of the first terminal, and the identifier of the first terminal. The transmission cycle of each of the parameters transmitted by the first terminal 210 may be different from each other.

For example, the transmission cycle for the identifier of the first terminal may be shorter than the transmission cycle of other parameters. For example, the identifier of the first terminal may be more frequently transmitted in comparison with other parameters.

In the example shown in FIG. 2, a single cooperative base station 220 transmits information about the interference channel and information about a transmission channel to the base station 230. It should be appreciated that a plurality of cooperative base stations may exist around the base station 230. In this example, each of the cooperative base stations 220 may individually transmit, to the base station 230, the information about interference channels and information about the transmission channel. For example, the base station 230 may receive the information about the interference channel and the information about the transmission channel from the plurality of cooperative base stations.

As illustrated in the image (II) of FIG. 1, the data transmission system includes the femto base stations 150 and 160 and the master base station 140. Terminal 151 and 161 receiving data from the femto base stations 150 and 160 may receive strong interference from the base station 140. Accordingly, the master base station 140 may accurately control interference on all the terminals 151 and 161 that receive data from the femto base stations 150 and 160.

In some embodiments, the master base station 140 may receive only an identifier of each of the femto base stations 150 and 160. The master base station 140 may identify each of the terminals 151 and 161 receiving data from the femto base stations 150 and 160, using the identifier of each of the femto base stations 150 and 160, and control interference on the identified terminals 151 and 161.

In some embodiments, the cooperative base station 220 may transmit an identifier of the first terminal 210 to the base station 230, using a backbone link between the cooperative base station 220 and the base station 230. In some embodiments, the first terminal 210 may directly transmit its own identifier to the base station 230 in a wireless manner.

In operation 270, the base station 230 may model the plurality of cooperative base stations 220 based on the information about the interference channel and the identifier which are received from the plurality of cooperative base stations 220, into a virtual cell.

In some embodiments, the base station 230 may model the plurality of cooperative base stations based on the identifier received in operation 263, into the virtual cell. The base station 230 may verify channel information of the first terminal 210 using the identifier of the first terminal 210 and the reference table.

In some embodiments, the base station 230 may model a virtual average cooperative base station and a virtual average first terminal by averaging the influence of interference on terminals included in the coverage of the cooperative base station 220. A virtual cell may include the virtual average cooperative base station and the virtual average first terminal.

According to another embodiment, the base station 230 may model a terminal receiving the strongest interference from the base station 230, into the single virtual cell.

In operation 280, the base station 230 may determine a data transmission power for each frequency band. The data transmission power may be a transmission power of second data transmitted to the second terminal 240 by the base station 230. When the data transmission power is increased, an interference signal transmitted to the first terminal 210 by the base station 230 may increase. Accordingly, the base station 230 may control the data transmission power to control the influence of the interference signal on the first terminal 210.

In some embodiments, the base station 230 may control the data transmission power based on the information about the interference channel associated with the virtual terminal included in the virtual cell.

For example, the interference channel information may include a channel gain of the interference channel and a data transmission priority between the first terminals.

When the channel gain of the interference channel is relatively great, the interference signal transmitted by the base station 230 may be insignificantly attenuated, and may be transmitted to the first terminal 210. Accordingly, the base station 230 may determine the data transmission power as a relatively low value, reducing the influence of the interference on the first terminal 210.

When the channel gain of the interference channel is relatively small, the interference signal transmitted by the base station 230 may be significantly attenuated, and may be transmitted to the first terminal 210. Accordingly, the base station 230 may determine the data transmission power to be a relatively high value, more effectively transmitting the second data to the second terminal 240 while maintaining the influence of the interference on the first terminal 210 at a relatively low value.

The data transmission priority of the first terminal 210 may include at least one service type used by the first terminal 210, an amount of transmission data to be transmitted to the cooperative base station 220 by the first terminal 210, and the time elapsed after most recently receiving data from the cooperative base station 220.

For example, the first terminal 210 may use a voice service. The voice service may be a service that is sensitive to a time delay. Accordingly, the data transmission priority of the first terminal 210 may be increased.

When the amount of the transmission data to be transmitted to the cooperative base station 220 is relatively great, the data transmission priority for the first terminal 210 may be determined to be high.

When the time elapsed after receiving the most recently received data from the cooperative base station 220 is relatively long, the data transmission priority for the first terminal 210 may be determined to be high.

When the data transmission priority of the first terminal 210 is relatively high, a probability for the cooperative base station 220 transmitting data to the first terminal 210 may be high. Accordingly, the base station 230 may determine the data transmission power such that the influence of the interference signal on the first terminal 210 may be reduced.

Figure 3:
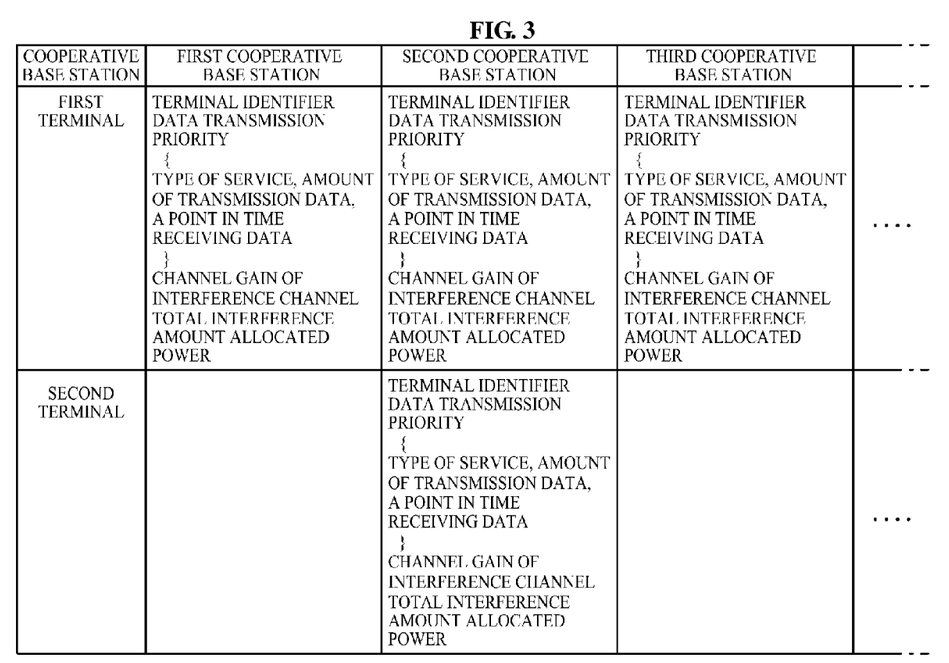
FIG. 3 is a diagram illustrating an example of virtual cell information that is generated using a reference table.

FIG. 3 illustrates an example of virtual cell information that is generated using a reference table.

A base station may receive the information about the interference channel from a plurality of cooperative base stations positioned around the base station. The base station may store the received information as illustrated in the reference table of FIG. 3. The cooperative base station may transmit, to the base station, information about an interference channel of terminals included in a coverage area that overlaps a coverage area of the base station.

Referring to FIG. 3, for example, the first cooperative base station may verify one or more terminals receiving the interference signal from the base station, from among terminals receiving data from a first cooperative base station. The first cooperative base station may transmit an identifier of the terminal receiving the interference signal.

In another example, interference channel information about one or more terminals receiving the interference signal from the base station, may be transmitted to the base station.

Also, a third cooperative base station may transmit, to the base station, information about an interference channel of one or more terminals.

As illustrated in FIG. 2, the base station 230 may model the plurality of cooperative base stations 220 and the plurality of first terminals 210 into a virtual cell. For example, the virtual cell may include a virtual base station and a virtual terminal. In this example, there is no need to calculate influence of an interference signal on each of the plurality of cooperative base stations. Accordingly, only influence of the interference signal on the virtual cell 180 or 181 may be calculated.

For example, the influence of the interference signal on the terminal 181 receiving the interference signal from the base station 170, from among terminals positioned within the virtual cell, may be calculated. Accordingly, the influence of the interference signal may be calculated, and the data transmission power of the base station 170 may be determined. Accordingly, the data transmission power of the base station 170 may be obtained by performing a single calculation.

As illustrated in FIG. 3, the interference channel information may include, for example, a data transmission priority of each terminal, a channel gain of the interference channel, a total amount of interference received by each terminal, and information about a data transmission power allocated to each terminal by each cooperative base station.

The data transmission priority may include a service type used by each terminal, an amount of transmission data to be transmitted to the cooperative base station by each terminal, and a point in time in which each terminal receives data from the cooperative base station.

The base station may calculate the influence from the interference signal received from the base station by the terminal, based on the information about the interference channel.

The base station may model the virtual cell based on the influence of the interference signal of each terminal.

In some embodiments, the base station may model a terminal receiving the strongest interference signal from the base station from among a plurality of terminals and a cooperative base station including the terminal receiving the strongest interference signal, into the virtual cell.

For example, the base station may control the data transmission power of the base station, based on the terminal receiving the strongest interference signal from the base station. Accordingly, the data reception performance of the terminal receiving the strongest interference signal from the base station may be improved.

In some embodiments, the base station may virtually generate an average terminal by averaging the influence of the interference signals of the plurality of terminals. The base station may control the data transmission power of the base station based on the generated average terminal.

In this example, by reducing the influence of the interference signal based on the averaging of the influence of interference signals of the plurality of terminals, the data reception performance of each terminal may be improved.

Figure 4:
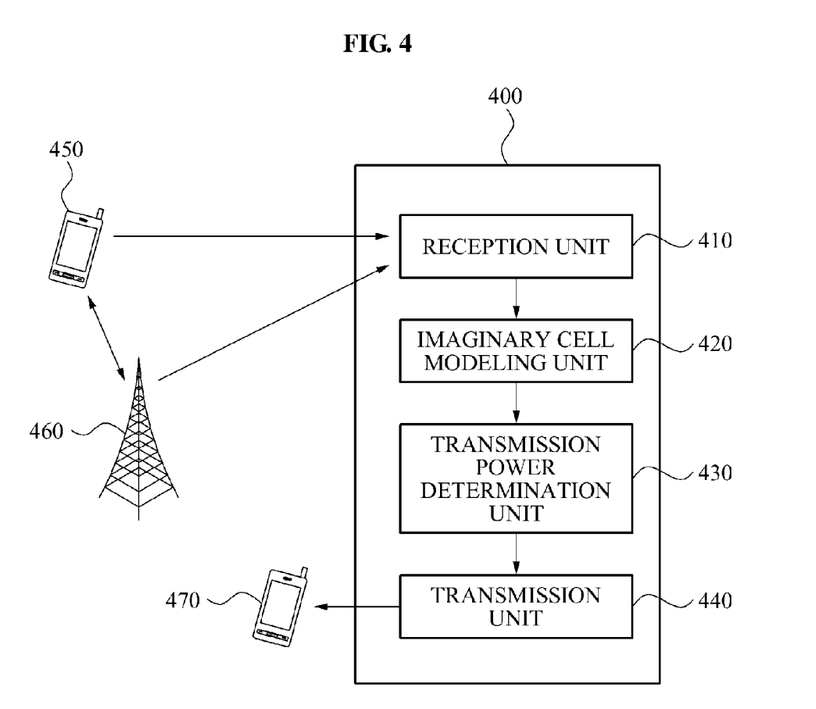
FIG. 4 is a diagram illustrating an example of a base station.

FIG. 4 illustrates an example of a base station.

Referring to FIG. 4, base station 400 includes a reception unit 410, a virtual cell modeling unit 420, a transmission power determination unit 430, and a transmission unit 440.

The reception unit 410 may receive information about an interference channel from one or more first terminals 450 that receive an interference signal from the base station 400. For example, the interference channel may be a radio channel between the base station 400 and the first terminal 450.

The interference channel information may include at least one of an identifier of the first terminal 450, a channel gain of the interference channel, a transmission power of a first data signal received by the first terminal 450 from a cooperative base station 460, and a data transmission priority of the first terminal 450.

The data transmission priority may include a service type that is used by the first terminal 450, an amount of transmission data to be transmitted to the cooperative base station 460 by the terminal 450, and a time elapsed after most recently receiving data from the cooperative base station 460.

In some embodiments, the reception unit 410 may receive information about an interference channel via the cooperative base station 460.

Also, the reception unit 410 may receive information about a transmission channel from the first terminal 450. For example, the transmission channel may be a channel between the cooperative base station 460 and the first terminal 450.

In some embodiments, the reception unit 410 may receive an identifier of the first terminal 450 in real time or in a significantly short reception cycle. The identifier of the first terminal 450 may indicate whether the first terminal 450 receives data from the cooperative base station 460.

When the first terminal 450 does not receive data from the cooperative base station 460, the base station does not consider the influence of the interference on the first terminal 450. Accordingly, the base station 400 may need to verify whether the first terminal 450 receives data.

The first terminal 450 may receive data from the cooperative base station 460 based on a channel state between the first terminal 450 and the cooperative base station 460. Because the channel state may change over time, information indicating whether the first terminal 450 receives data may be frequently updated based on the channel state. Accordingly, the first terminal 450 may transmit, in real time, the identifier of the first terminal 450 indicating whether the first terminal 450 receives data. The first terminal 450 may transmit the identifier of the first terminal 450 in a significantly short transmission cycle.

In some embodiments, the reception unit 410 may receive other information other than the identifier of the first terminal 450 in relatively longer reception cycles. The amount of information included in the interference channel information may include a large amount of information due to information about the channel state. Accordingly, the first terminal 450 may transmit, in non-real time, the other information using the radio channel between the first terminal 450 and the cooperative base station 460.

For example, when the reception unit 410 receives the identifier of the first terminal 450 in a first reception cycle, and receives other information in a second reception cycle, a value of the second reception cycle may be greater than a value of the first reception cycle.

In some embodiments, a value for the interference channel information and the transmission channel information, which are received from the first terminal 450 by the reception unit 410, may be obtained by averaging a value for the interference channel and a value for the transmission channel, respectively, over a predetermined period of time. For example, the first terminal 450 may estimate the channel gain of the interference channel, and average the estimated channel gain for the predetermined period of time. The reception unit 410 may receive an average value of the channel gain from the first terminal 450.

In the example shown in FIG. 4, a single cooperative base station 460 and a single first terminal 450 are illustrated, however, it should be appreciated that the reception unit 410 may receive interference channel information from a plurality of first terminals 450 positioned within coverages of the cooperative base stations.

The reception unit 410 may store the interference channel information received from each of the plurality of first terminals 450, as illustrated in the reference table of FIG. 3.

The virtual cell modeling unit 420 may model the plurality of first terminals and the plurality of cooperative base stations into a virtual cell, based on the interference channel information of the plurality of first terminals 450.

When one or more cooperative base stations 460 exist around the base station 400, the base station 400 may determine a data transmission power based on the influence of an interference signal on the cooperative base stations 460. The data transmission power of each of the plurality of cooperative base stations 460 may be determined after determining the data transmission power of the base station 400. Also, the data transmission power of the base station 400 may be updated based on the data transmission power of each of the cooperative base stations 460.

When the one or more cooperative base stations 460 exist, a data transmission power of a second cooperative base station may be determined based on a data transmission power determined with respect to a first cooperative base station. Also, based on the data transmission power of the second cooperative base station, the data transmission power of the base station 400 may be continuously updated. Because the above described process is repeatedly performed with respect to each of the plurality of cooperative base stations, the determining of the data transmission power of the base station 400 may become more complex.

In some embodiments, the plurality of cooperative base stations may be modeled into a single virtual cell, and the data transmission power of the base station 400 may determined more easily for a single virtual cell as opposed to a plurality of cells.

In some embodiments, the virtual cell modeling unit 420 may model a terminal receiving the strongest influence of the interference signal from the base station 400 from among the plurality of terminals and a cooperative base station connected to the terminal receiving the strongest influence of the interference signal, into a virtual cell.

In some embodiments, the virtual cell modeling unit 420 may virtually generate an average terminal and an average cooperative base station by averaging the influence of the interference signals of each of the plurality of terminals. The base station may model the generated average terminal and the average cooperative base station into a virtual cell.

The transmission power determination unit 430 may determine the transmission power for a second terminal 470 based on the virtual cell. The second terminal 470 may be positioned within a coverage of the base station 400, and may be a terminal receiving second data from the base station 400. The second data transmitted to the second terminal 470 by the base station 400 may act as an interference signal with respect to the first terminal 450. Accordingly, the base station 400 may control the data transmission power of the second data, and may control the influence of the interference signal on the first terminal 450.

When the base station 400 transmits the second data to the second terminal 470 using a plurality of frequency bands, the transmission power determination unit 430 may determine a data transmission power for each of the plurality of frequency bands.

Figure 5:
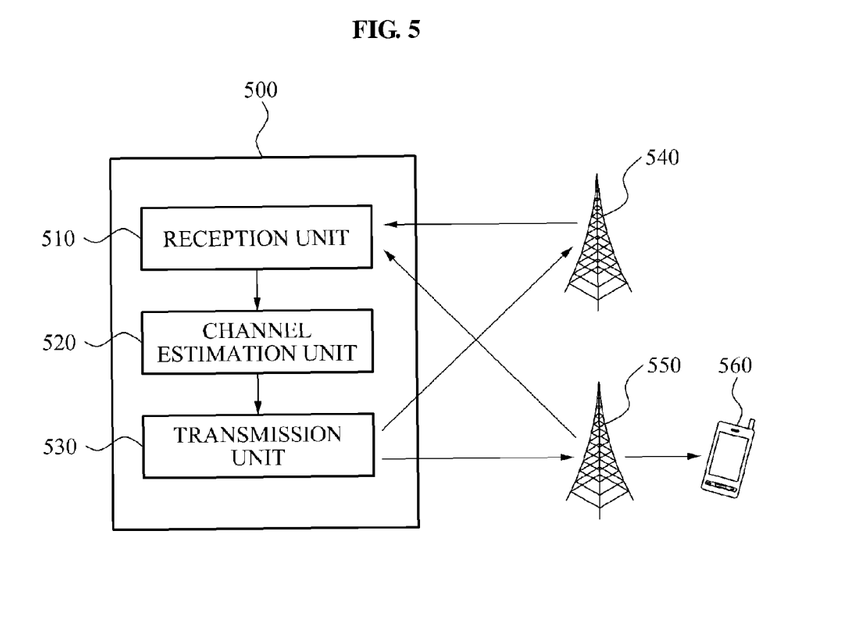
FIG. 5 is a diagram illustrating an example of a terminal.

FIG. 5 illustrates an example of a terminal.

Referring to FIG. 5, first terminal 500 includes a reception unit 510, a channel estimation unit 520, and a transmission unit 530.

In FIG. 5, a cooperative base station 540 may transmit first data to the first terminal 500, and a base station 550 may transmit second data to a second terminal 560. The second data transmitted by the base station 550 may act as an interference signal on the first terminal 500.

The reception unit 510 may receive the interference signal from the base station 550. The base station 550 may transmit a second data signal to the second terminal 560 using a plurality of frequency bands. In this example, the reception unit 510 may receive the interference signal from the base station 550 using the plurality of frequency bands.

The channel estimation unit 520 may generate information about an interference channel. For example, the interference channel may be a radio channel between the first terminal 500 and the base station 550. When the base station 550 transmits the second data signal to the second terminal 560 using the plurality of frequency bands, the channel estimation unit 520 may generate the information about the interference channel for each of the plurality of frequency bands.

In some embodiments, the interference channel information may include at least one of an identifier of the first terminal 500, a channel gain of the interference channel, and a data transmission priority of the first terminal 500.

The data transmission priority may include at least one service type used by the terminal 500, an amount of transmission data to be transmitted to the cooperative base station 540 positioned adjacent to the base station 550, and a time elapsed after receiving the most recent data.

The transmission unit 530 may transmit the information about the interference channel to the base station 550.

In some embodiments, the transmission unit 530 may transmit the information about the interference channel to the base station 550 via the cooperative base station 540.

The base station 550 may control an intensity of the interference signal based on the interference signal information. When the base station 550 transmits the second data using the plurality of frequency bands, the base station 550 may control the intensity of the interference signal for each of the plurality of frequency bands.

In some embodiments, the base station 550 may model a plurality of cooperative base stations positioned around the base station 550 into a virtual cell, based on the information about the interference channel. The base station 550 may control the data transmission power of the second data based on the virtual cell. Accordingly, the intensity of the interference signal transmitted to the first terminal 500 by the base station 550 may be controlled.

In some embodiments, the transmission unit 530 may periodically transmit information about the interference signal to the base station 550. The information about the interference signal may include a variety of information, and the transmission cycle of each of the variety of information may be different from each other.

For example, the information about the interference signal may include an identifier of the terminal 500. The identifier of the terminal 500 may indicate whether the terminal 500 has received data from the cooperative base station 540. When the terminal 500 does not receive data, and there is no need to control interference on the terminal 500 by the base station 550, the identifier of the terminal 500 may be transmitted to the base station 550 in real time or in a significantly short transmission cycle.

The interference signal information may include a channel gain of the interference channel. Often the channel gain of the interference channel may include information about a radio channel, and the amount of information of the channel gain may be significant. For example, if a bandwidth between the terminal 500 and the base station 550 is limited, the terminal 500 may transmit, in non-real time, the channel gain of the interference channel to the base station 550.

In some embodiments, the terminal 500 may transmit the channel gain of the interference channel to the base station 550 in a predetermined transmission cycle. The terminal 500 may average the channel gain of the interference channel for a predetermined transmission cycle, and transmit, to the base station 550, an average value of the channel gain in the predetermined transmission cycle.

In the example described above, only the channel gain of the interference channel is described, however, the terminal 500 may average other information, for example, the data transmission priority of the terminals, in the similar manner, and transmit the obtained average value to the base station 550.

In some embodiments, a first transmission cycle in which the terminal 500 transmits the identifier of the terminal 500 to the base station 550 may be shorter than a second transmission cycle in which the terminal 500 transmits the other information about the interference channel to the base station 550. For example, the identifier of the terminal 500 may be more frequently transmitted to the base station 550 in comparison with the other information about the interference channel.

Figure 6:
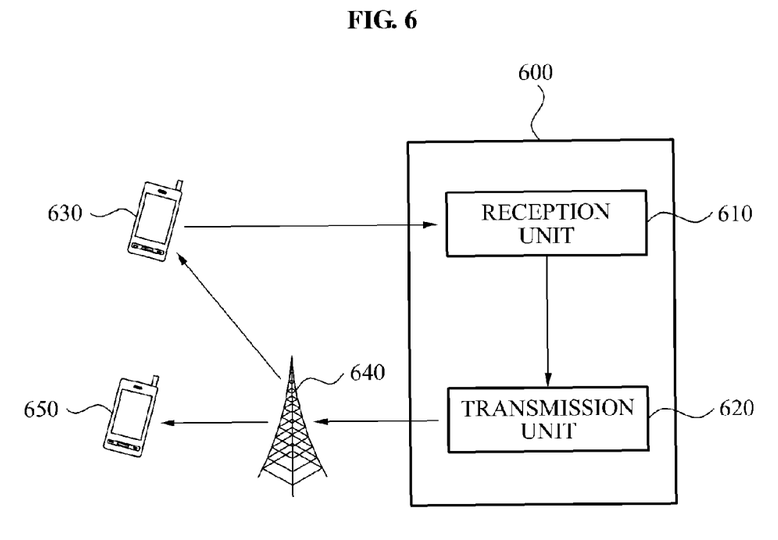
FIG. 6 is a diagram illustrating an example of a cooperative base station.

FIG. 6 illustrates an example of a cooperative base station.

Referring to FIG. 6, cooperative base station 600 includes a reception unit 610 and a transmission unit 620.

The cooperative base station 600 may transmit first data to a first terminal 630, and a base station 640 may transmit second data to a second terminal 650. The second data transmitted by the base station 640 may act as an interference signal to the first terminal 630. The base station 640 may control the intensity of the interference signal by controlling the data transmission power for the second data.

The reception unit 610 may receive information about an interference channel from the terminal 630. For example, the interference channel may be a radio channel between the first terminal 630 and the base station 640. When the base station 640 transmits the second data using a plurality of frequency bands, the first terminal 630 may receive the interference signal from the base station 640 using the plurality of frequency bands. The first terminal 630 may generate the interference channel information based on the interference signal, and transmit the generated information about the interference channel to the cooperative base station 600.

In some embodiments, the information about the interference channel may include at least one of an identifier of the first terminal 630, a channel gain of the interference channel, and a data transmission priority of the first terminal 630.

The data transmission priority may include at least one service type used by the first terminal 630, an amount of transmission data to be transmitted to the cooperative base station 600 by the first terminal 630, and the time elapsed after receiving the most recently received data from the cooperative base station 600 by the first terminal 630.

The transmission unit 620 may transmit the information about the interference channel to the base station 640. The base station 640 may control the data transmission power for the second data based on the interference channel information. Accordingly, the intensity of the interference signal transmitted to the first terminal 630 may be controlled. When the base station 640 transmits, to the second terminal 650, the second data using the plurality of frequency bands, an intensity of the interference signal for each of the plurality of frequency bands may be controlled.

In some embodiments, the base station 640 may model a plurality of cells positioned around the base station 640 into a virtual cell, based on the information about the interference channel. The base station 640 may control the data transmission power of the second data based on the virtual cell.

As set forth herein, the base stations such as micro stations, femto stations, macro stations, and the like, may gather interference information from the terminals within their coverage area. The various cells may cooperate with each other and share the interference information. Based on the shared interference information, the base stations may generate a virtual cell including a single virtual base station and a single virtual terminal. Accordingly, interference is reduced and system performance is increased.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop and/or tablet personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station, comprising:
   a reception unit configured to receive, from a plurality of first terminals receiving interference signals from the base station, information of interference channels between the base station and the plurality of first terminals, the plurality of first terminals being located in a neighbor cell adjacent to a target cell of the base station;
   a virtual cell modeling unit configured to model the plurality of first terminals and a plurality of cooperative base stations into a virtual cell, based on the received information of interference channels between the base station and the plurality of first terminals,
   wherein the plurality of cooperative base stations are configured to transmit first data signals to each of the plurality of first terminals; and
   a transmission power determination unit configured to determine a transmission power for each of a plurality of frequency bands with respect to a plurality of second terminals receiving second data signals from the base station, based on the virtual cell such that the transmission power determination unit is configured to control the transmission power of the second data signals according to the received information of interference channels between the base station and the plurality of first terminals,
   wherein the information comprises at least one of: an identifier of each of the plurality of first terminals, a channel gain of the interference channels, a transmission power of the first data signals, and data transmission priority of the plurality of first terminals, and
   wherein a reception cycle for the identifier of the first terminal is shorter than a reception cycle for each of: the channel gain of the interference channels, the transmission power of the first data signals, and the data transmission priority of the first terminal.

2. The base station of claim 1, wherein the reception unit is further configured to receive the information of interference channels via at least one of the plurality of cooperative base stations.

3. The base station of claim 1, wherein the data transmission priority comprises at least one of: a type of a service used by each of the plurality of first terminals, an amount of transmission data to be transmitted to the cooperative base stations by each the of the plurality of first terminals, and a time elapsed since each of the plurality of first terminals receives most recent data.

4. The base station of claim 3, wherein:
   the reception unit is further configured to periodically receive at least one of: the identifier of the first terminals, the channel gain of the interference channels, the transmission power of the first data signals, and the data transmission priority of the first terminals.

5. The base station of claim 1, wherein the reception unit is further configured to additionally receive, from the plurality of first terminals, information about transmission channels between the plurality of cooperative base stations and the plurality of first terminals.

6. The base station of claim 1, wherein the virtual cell modeling unit is further configured to model the virtual cell based on an average of the interference signals that the plurality of first terminals receive from the base station.

7. The base station of claim 1, wherein the virtual cell modeling unit is further configured to model the virtual cell based on an interference signal comprising a greatest intensity from among interference signals that the plurality of first terminal receive from the base station.

8. The base station of claim 1, wherein the plurality of cooperative base stations comprise a femto base station configured to transmit data using a radio resource unused by the base station.

9. The base station of claim 1, wherein:
   the information is transmitted to the plurality of cooperative base stations from the plurality of first terminals; and
   the reception unit is further configured to:
      receive the information using a backbone link between the plurality of cooperative base stations and the base station; or
      directly receive the information from the plurality of first terminals.

10. The base station of claim 1, wherein the transmission power determination unit is further configured to determine the transmission power by one calculation.

11. The base station of claim 1, wherein:
   the base station is configured to determine which one of the plurality of first terminals receives data from a respective one of the plurality of cooperative base stations; and
   the virtual cell modeling unit is configured to model a determined one of the plurality of first terminals and a respective one of the plurality of cooperative base stations into the virtual cell, excluding others of the plurality of first terminals.

12. The base station of claim 1, wherein the transmission power determination unit is configured to lower the transmission power as a channel gain of the interference channels increases.

13. A terminal, comprising:
   a reception unit configured to receive interference signals from a base station using a plurality of frequency bands;

a channel estimation unit configured to generate, for each of the plurality of frequency bands, information of an interference channel between the base station and the terminal based on the interference signals, the terminal being located in a neighbor cell adjacent to a target cell of the base station; and a transmission unit configured to transmit the information of the interference channel between the base station and the terminal to the base station, wherein an intensity of each of the interference signals is controlled for each of the plurality of frequency bands based on the information, and wherein the information of the interference channel between the base station and the terminal is modeled into a single virtual cell by the base station, wherein the information comprises at least one of: an identifier of the terminal, a channel gain of the interference channel, and a data transmission priority of the terminal, wherein the transmission unit is further configured to:

transmit the identifier of each terminal in a first transmission cycle; and transmit the channel gain of the interference channel and the data transmission priority of each terminal in a second transmission cycle that is greater than the first transmission cycle.

14. The terminal of claim 13, wherein the data transmission priority comprises at least one of: a service type used by the terminal, an amount of transmission data to be transmitted to a cooperative base station neighboring the base station by the terminal, and a time elapsed since the terminal receives most recent data.

15. The terminal of claim 13, wherein the transmission unit is further configured to transmit the information to the base station via a cooperative base station neighboring the base station.

16. The terminal of claim 13, wherein:

the information is used for modeling a virtual cell for the terminal; and the interference signals are controlled based on the virtual cell.

17. A cooperative base station, comprising:

a reception unit configured to receive, from a terminal receiving interference signals from a base station, information of an interference channel between the base station and the terminal, the terminal being located in a neighbor cell adjacent to a target cell of the base station and a transmission unit configured to transmit the information to the base station, wherein the reception unit is further configured to receive the information of the interference channel between the base station and the terminal using a plurality of frequency bands, wherein an intensity of each of the interference signals is controlled for each of the plurality of frequency bands, based on the information of the interference channels between the base station and the terminal, and wherein the information of the interference channel between the base station and the terminal is modeled into a single virtual cell by the base station, wherein the information includes at least one of an identifier of the terminal, a channel gain of the interference channel, and a data transmission priority of the terminal, and wherein a transmission cycle for the identifier of the terminal is shorter than a transmission cycle for each of the channel gain of the interference channel, and the data transmission priority of the terminal.

18. The cooperative base station of claim 17, wherein the data transmission priority comprises at least one of: a service type used by the terminal, an amount of transmission data to be transmitted to the cooperative base station by the terminal, and a time elapsed since the terminal receives most recent data.

19. The cooperative base station of claim 1, wherein:

the information is used for modeling a virtual cell for the terminal; and the interference signals are controlled based on the virtual cell.

* * * * *